(12) United States Patent
Hamilton

(10) Patent No.: US 11,722,626 B2
(45) Date of Patent: *Aug. 8, 2023

(54) DESIGNATED REGION PROJECTION PRINTING

(71) Applicant: Steelcase Inc., Grand Rapids, MI (US)

(72) Inventor: John Hamilton, San Rafael, CA (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,082

(22) Filed: Mar. 31, 2022

(65) Prior Publication Data
US 2022/0284541 A1     Sep. 8, 2022

Related U.S. Application Data

(63) Continuation of application No. 16/985,426, filed on Aug. 5, 2020, now Pat. No. 11,321,810, which is a
(Continued)

(51) Int. Cl.
*H04N 1/387* (2006.01)
*G06K 15/02* (2006.01)
*G06T 3/00* (2006.01)

(52) U.S. Cl.
CPC ......... *H04N 1/3873* (2013.01); *G06K 15/021* (2013.01); *G06K 15/1849* (2013.01);
(Continued)

(58) Field of Classification Search
None
See application file for complete search history.

(56) References Cited

U.S. PATENT DOCUMENTS 2,748,839 A  6/1956 Mednick
3,805,650 A  4/1974 Pearl
(Continued)

FOREIGN PATENT DOCUMENTS

CN  103303172 B  9/2013
EP  0246393 A2  11/1987
(Continued)

OTHER PUBLICATIONS

Image—Astonishing Floral Cheap Accent Swivel Chair, May 15, 2017; retrieved from the Internet Nov. 6, 2018.
(Continued)

*Primary Examiner* — Scott A Rogers
(74) *Attorney, Agent, or Firm* — Crowell & Moring LLP

(57) ABSTRACT

A system determines an object-design for a three-dimensional model of an object. The object-design may exhibit a design continuity. The system breaks the object-design in to spatial patterns corresponding to the discrete surfaces making up the outward surface of the object. The system then generates flattened patterns by projecting the spatial patterns into a two-dimensional plane. The system prints the flattened patterns on to designated regions of material sheets in an orientation that preserves the design continuity of the object-design. The regions may be extracted from the sheets and then joined at their edges to form a cover for object that exhibits the continuity of the object design.

20 Claims, 5 Drawing Sheets

Related U.S. Application Data continuation of application No. 16/183,259, filed on Nov. 7, 2018, now Pat. No. 10,762,595.

(60) Provisional application No. 62/583,339, filed on Nov. 8, 2017.

(52) U.S. Cl.
CPC ........ *G06K 15/1868* (2013.01); *G06T 3/0031* (2013.01); *G06K 2215/0097* (2013.01); *G06T 2200/04* (2013.01); *G06T 2219/008* (2013.01); *G06T 2219/021* (2013.01)

(56) References Cited

U.S. PATENT DOCUMENTS

| | | |
|---|---|---|
| 4,025,963 A | 5/1977 | Sugita |
| 4,296,964 A | 10/1981 | Haack |
| 4,853,866 A | 8/1989 | Galan et al. |
| 5,089,971 A | 2/1992 | Gerber |
| 5,172,326 A | 12/1992 | Campbell, Jr. et al. |
| 5,255,352 A | 10/1993 | Falk |
| 5,333,111 A | 7/1994 | Chaiken et al. |
| 5,341,305 A | 8/1994 | Clarino et al. |
| 5,749,247 A | 5/1998 | Jeffcoat |
| 5,831,857 A | 11/1998 | Clarino et al. |
| 5,867,392 A | 2/1999 | Bousquet |
| 5,886,319 A | 3/1999 | Preston et al. |
| 6,134,923 A | 10/2000 | Lay et al. |
| 6,144,890 A | 11/2000 | Rothkop |
| 6,173,211 B1 | 1/2001 | Williams et al. |
| 6,178,859 B1 | 1/2001 | Pamerleau et al. |
| 6,192,777 B1 | 2/2001 | Williams et al. |
| 6,301,518 B1 | 10/2001 | Kawaguchi |
| 6,389,322 B1 | 5/2002 | Park et al. |
| 6,434,444 B2 | 8/2002 | Herman, Jr. |
| 6,491,361 B1 | 12/2002 | Spann |
| 6,580,962 B2 | 6/2003 | Rapoza et al. |
| 6,807,289 B2 | 10/2004 | Zink |
| 6,856,843 B1 | 2/2005 | Herman, Jr. |
| 6,968,075 B1 * | 11/2005 | Chang .................. G06V 20/653 |
| | | 706/919 |
| 7,003,370 B2 | 2/2006 | Rapoza |
| 7,360,834 B2 | 4/2008 | Miller et al. |
| 7,422,281 B2 | 9/2008 | Miller |
| 7,637,567 B2 | 12/2009 | Neustat et al. |
| 7,857,384 B2 | 12/2010 | Miller |
| 7,873,434 B2 | 1/2011 | Pape |
| 8,111,921 B2 | 2/2012 | Hsu et al. |
| 8,155,774 B2 | 4/2012 | Wu et al. |
| 8,654,123 B2 | 2/2014 | Tokumaru |
| 8,708,590 B2 | 4/2014 | Johnson et al. |
| 8,838,482 B2 | 9/2014 | Schindler et al. |
| 8,849,444 B2 | 9/2014 | George |
| 9,421,692 B2 | 8/2016 | Campbell et al. |
| 9,623,578 B1 | 4/2017 | Aminpour et al. |
| 2007/0210043 A1 | 9/2007 | Mastin |
| 2013/0247272 A1 | 9/2013 | Reed et al. |
| 2015/0107033 A1 | 4/2015 | Chang et al. |
| 2015/0279087 A1 | 10/2015 | Myers et al. |
| 2017/0042341 A1 | 2/2017 | Scales |
| 2017/0105468 A1 | 4/2017 | Ngo Ngoc et al. |

FOREIGN PATENT DOCUMENTS

| | | |
|---|---|---|
| FR | 2399223 A1 | 3/1979 |
| GB | 2297251 B | 7/1996 |
| GB | 2418131 A | 3/2006 |
| JP | 5662138 B2 | 1/2015 |
| JP | 5719603 B2 | 5/2015 |
| WO | WO 1993/014258 A1 | 7/1993 |
| WO | WO 04/041541 | 5/2004 |

OTHER PUBLICATIONS

Image—Serene Albany Chocolate Swivel Chair, May 15, 2017; retrieved from the Internet Nov. 6, 2018.

* cited by examiner

DESIGNATED REGION PROJECTION PRINTING

PRIORITY

This application is a continuation of and claims priority to U.S. patent application Ser. No. 16/985,426, filed Aug. 5, 2020, which is incorporated by reference in its entirety. U.S. patent application Ser. No. 16/985,426 is a continuation of and claims priority to U.S. patent application Ser. No. 16/183,259, filed Nov. 7, 2018, which is incorporated by reference in its entirety. U.S. patent application Ser. No. 16/183,259 claims priority to U.S. Provisional Patent Application Ser. No. 62/583,339, filed Nov. 8, 2017, which is incorporated by reference in its entirety.

TECHNICAL FIELD

This disclosure relates to printing designs on object covers.

BACKGROUND

Rapid advances in material printing technologies have increased manufacturing flexibility and customization. As just one example, surface printing and three-dimensional printing techniques have rendered feasible near-on-demand and on-demand custom manufacturing. Improvements in printing technology implementation and functionality will further enhance manufacturing flexibility and customization.

DETAILED DESCRIPTION

Figure 1:
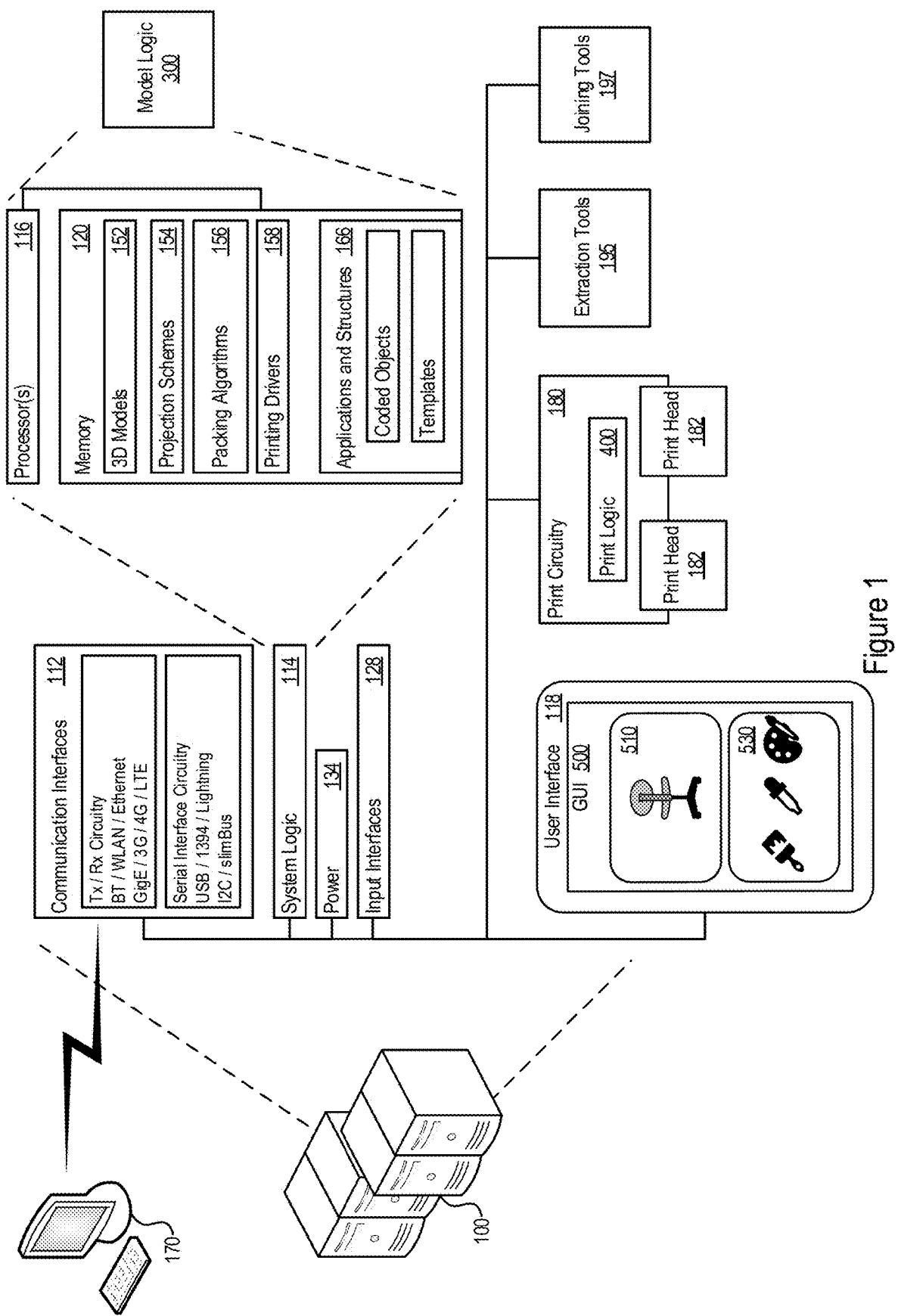
FIG. 1 shows an example design printing system.

For various objects, such as furniture, upholstered furnishings, office fixtures, home furnishings, automotive seating, or other objects with material covers, it may be desirable to generate covers that include an object-design (e.g., a complete material cover design for an object) on the covers' outward surfaces. Further, it may be desirable for the continuity of the object-design to be maintained across edges (e.g., locations where material sheets making up a cover are joined in a seam or are folded resulting in a potential break in continuity in an object-design on the surface of the object).

Object-design continuity may be maintained by aligning and orienting visual features such that the features appear uninterrupted by the edge. For example, continuity may be maintained by aligning visual elements such that patterns, lines, images, or other visual elements do not undergo an abrupt shift or discontinuity across an edge, e.g., alignment continuity. Additionally or alternatively, continuity may be maintained by orienting visual features such that the visual features maintain a consistent orientation across an edge, e.g., orientation continuity. For example, when a three-dimensional object is wrapped using one or more flat material sheets (e.g., fabric sheets, plastic sheets, metal sheets, rubber sheets, or other material sheets), the design on the material orients according to how the sheet is folded over the object. A design the runs perpendicular to a first discrete surface (e.g., a defined surface of an object) with a first orientation may run perpendicular to second discrete surface with a second orientation after a fold. Following such a fold, the orientation of the design shifts. Maintaining consistent orientation across an edge (e.g., a fold, a seam, or other edge) may involve orienting the visual features on the flat sheet such that when the seam contours to the object, the orientation of the design is maintained despite the change in orientation of the sheet.

Three-dimensional objects with material covers may include multiple discrete surfaces (e.g. which may be flat or curved). In some cases, two or more two-dimensional material sheets may be joined at seams to makeup a cover the fits the contours of the object. The discrete surfaces of the object may meet along curves or straight lines. Accordingly, parsing an object-design across an edge (e.g., to maintain alignment continuity) may be more complex than dividing the object-design across a straight border. Further, the discrete surfaces of the object may have irregular shapes adding to the complexity of the edges. For example a single edge that creates a contour for an irregularly shaped discrete surface may include straight sections, curved sections, angled corners, or any combination thereof.

Moreover, to maintain orientation continuity, an object-design may be divided into portions with different orientations when on flat sheets such that the portions have the same orientation (or otherwise maintain orientation continuity) when applied to the three-dimensional object.

In addition, in cases where it is possible to maintain object-design continuity in three dimensions by cutting regions from one or more material sheets with a design in two-dimensions, the regions cut from the material sheets may be defined by the design present on the material sheets. Accordingly, this technique may lead to wasted material because the regions are selected to maintain continuity rather than to minimize waste.

The architectures and techniques discussed below provide a system that obtains an object-design applied in a continuity-maintaining fashion to a three-dimensional model of an object. From the three-dimensional model, the system determines spatial patterns, which are portions of the object-design in three dimensions divided along the edges within the three-dimensional model. The system projects the spatial patterns into two-dimensions to form flattened patterns, while maintaining the alignment and orientation (e.g., relative to the edges) of the spatial patterns. The system prints the flattened patterns onto regions of material sheets designated for each of the discrete surfaces. The system may designate the regions in accord with a packing algorithm to reduce material waste relative to unguided packing.

Because system prints the flattened patterns after designation of the regions on the material sheet, the regions may be designated without regard to the eventual pattern printed. Accordingly, in at least some cases, waste reduction may be the only parameter guiding the process of packing the regions on to one or more material sheets. The size and shape of the designated regions may be determined according to the size and shape of the discrete surfaces on the object.

The system may further include a design interface, which may be implemented on circuitry. A user may provide a custom object-design for an object using the design interface. For example, a user may edit a three-dimensional model of an object to create an object-design for the object in three dimensions. Alternatively or additionally, the user may render a model for the object using a third party design package, e.g., Autodesk®, SolidWorks®, FreeCAD™, SketchUp®, or other third party design package. The user may provide the rendered model output from the third party design package to the design interface as an input. Alternatively or additionally, a user may capture image data from an existing object and apply the captured image data to a three-dimensional model via the design interface. Accordingly, an existing object may be used as a template for the object-design for new objects.

The projection of the spatial pattern into a flattened pattern may determine in part the printed output on a material sheet. Accordingly, the projection controls a concrete real world physical output. Similarly, the design interface may also determine the printed output on a material sheet resulting in a concrete real world physical output. Moreover, the designation of regions on the material sheet controls the amount of the material sheet wasted after the printing process. Accordingly the techniques and architectures discussed herein with regard to designation of regions affect the efficiency and performance of the printing system. Therefore, the projection of the spatial pattern, the design interface, and the designation of regions, together and individually, improve the underlying operation of the hardware of the system by improvising efficiency and controlling physical outputs.

The printing of flattened patterns based on projections of spatial patterns that include curved surfaces in three dimensions results in printing that in two-dimensions appears misaligned and discontinuous. Producing base cover material with continuity on flat sheets (e.g., unchanging a repeating pattern) has been viewed as the way to obtain aesthetically pleasing outputs for three-dimensional object covers. Generating base cover material with apparent discontinuities in two dimensions has been viewed as leading to undesirable discontinuities in the finished three-dimensional product. Accordingly, the apparent discontinues in the printing output resulting from the projections used in techniques and architectures discussed herein would be viewed as errors in printing. Expressed another way the printing of flattened patterns based on projections of spatial patterns that include curved surfaces in three dimensions proceeds contrary to accepted wisdom.

In addition, non-repeating designs, such as photographs, high contrast lines, or other non-repeating designs are viewed as being dependent on a degree of alignment and/or orientation continuity that is outside of reliably achieved levels for manufactured objects with material covers. Accordingly, such non-repeating designs were incorrectly viewed as unacceptable designs for such material covers. Accordingly, applying arbitrary designs to material covers proceeds contrary to accepted wisdom.

Referring now to FIG. 1, an example design printing system (DPS) 100 is shown. The DPS 100 may include system logic 114 to support execution of the model logic 300 and the print logic 400 described below. The system logic may include processors 116, memory 120, and/or other circuitry.

The memory 120 may include three-dimensional models 152 projection schemes 154, packing algorithms 156, and printing drivers 158. The memory 120 may further include applications and structures 166, for example, coded objects, machine instructions, templates, or other structures to support model manipulation and editing, projection, packing, printing or other tasks described below.

In various implementations, the system logic 114 may be distributed over multiple physical servers, be implemented as a virtual machine, and/or be implemented, at least in part, as one or more serverless applications.

The DPS 100 may also include communication interfaces 112, which may support wireless, e.g. Bluetooth, Wi-Fi, WLAN, cellular (4G, LTE/A), and/or wired, Ethernet, Gigabit Ethernet, optical networking protocols. The communication interfaces 112 may also include serial interfaces, such as universal serial bus (USB), serial ATA, IEEE 1394, lighting port, $I^2C$, slimBus, or other serial interfaces. The DPS 100 may include power functions 134 and various input interfaces.

The DPS 100 may also include a design interface 118 that may include human-to-machine interface devices (HIDs) and/or graphical user interfaces (GUI), e.g., example design GUI 500, discussed in detail below. The design interface 118 may be in data communication with the communication interfaces 112 to support reception of design input from terminal stations 170. In some implementations, the terminal stations 170 may execute third party design packages. Further, in some cases, the DPS 100 may generate GUIs on terminal stations 170 to support remote design control using design tools native to the DPS 100.

The DPS 100 may further include print circuitry 180. The print circuitry 180 may include one or more print heads 182. The print heads 182 may include print heads for printing on flat material sheets. Further, the print heads 182 may, additionally or alternatively, include three-dimensional print heads which may print the underlying material itself including the design visible on the surface of the material.

Figure 2:
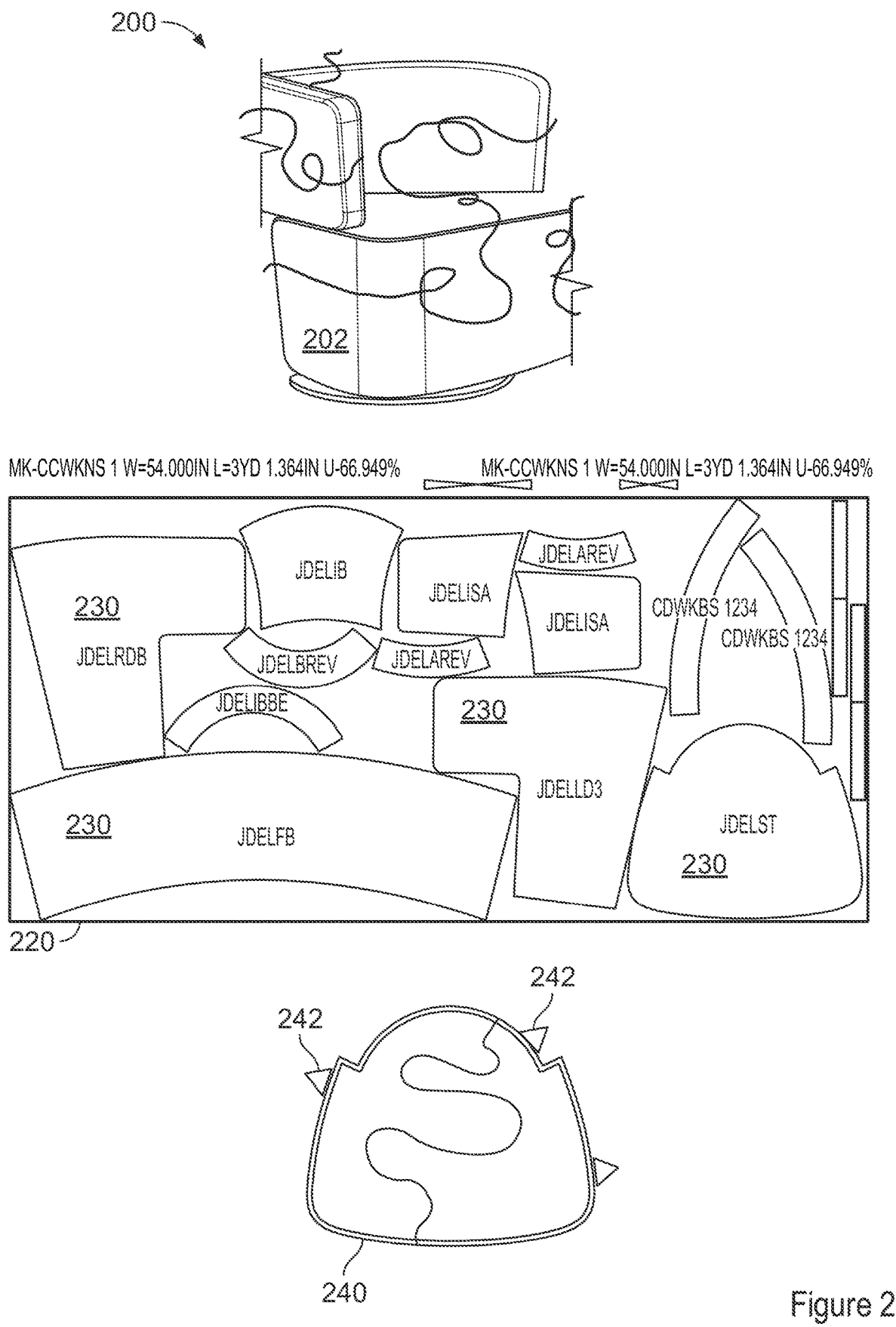
FIG. 2 shows an example object printed material sheet and an extracted designated region.

FIG. 2 shows an example object 200 printed material sheet 220 and an extracted designated region 240. The example object 200 includes a cover 202. The multiple extracted designated regions 240 are joined together at the regions' edges (e.g., forming seams). In various implementations, extracted designated regions 240 may be joined using various techniques including stitching/sewing, gluing, welding, stapling, or otherwise affixing the extracted designated regions to one another.

The printed material sheet 220 may include multiple designated regions 230, which the DPS 100 may pack on to the sheet in accord with a packing algorithm. The DPS 100 prints flattened patterns on to the designated regions 230. The printed designated regions 230 may be extracted to form extracted designated regions 240. The system may extract the designated regions from the material sheets via cutting (e.g., laser cutting, sharp-edge cutting, sawing, plasma cutting, thermal cutting, water jet cutting, or other cutting process) pressing, tearing, shearing, or other process for removing a shaped region from a material sheet.

The extracted designated regions 240 may include alignment markers 242. The alignment markers 242 may assist during the later process of joining the extracted designated regions. The alignment makers may be added by the DPS 100 during printing, while determining the shape and size of the designated region, during another period in which the region or material sheet is altered, or any combination thereof. The alignment markers may be visible, machine perceptible, or, other marking allowing particular locations on the extracted designated regions to be mated with one another. For example, the alignment markers may include tabs jutting out from the designated regions, barcodes, stiches, printed markers, affixed patches, areas with magnetized or capacitive materials, or other detectable markers. In some cases, the DPS 100 may place alignment markers 242 such that the alignment markers 242 may be not visible or imperceptible once the extracted designated regions 240 are joined into a cover and applied to the object.

While joining the extracted designated regions 240 to one another, the system may align mated markers to one another. The system may scan for the machine perceptible alignment markers on the extracted designed regions. The detected markers may be positioned proximate to mated markers. In some cases, mated markers may share design features. In some cases, mated markers may be used for fine tuning alignment once coarse alignment has been completed. Accordingly, mated design markers may not necessarily include features that distinguish markers from makers to which the markers are not mated.

By aligning the alignment markers that system may ensure that the continuity maintained by printing the flattened patterns on the designated regions is preserved after the printed regions are joined together.

Accordingly, in some implementations, the DPS 100 of FIG. 1 may further include extraction tools 195, which may include tools (e.g., computer controlled tools using on more of the extraction techniques discussed above) for extracting the designated regions from the material sheets. Additionally or alternatively, the DPS 100 may include joining tools 197, which may include tools (e.g., computer controlled tools using on more of the joining techniques discussed above) for joining the extracted sheets in to a cover.

Figure 3:
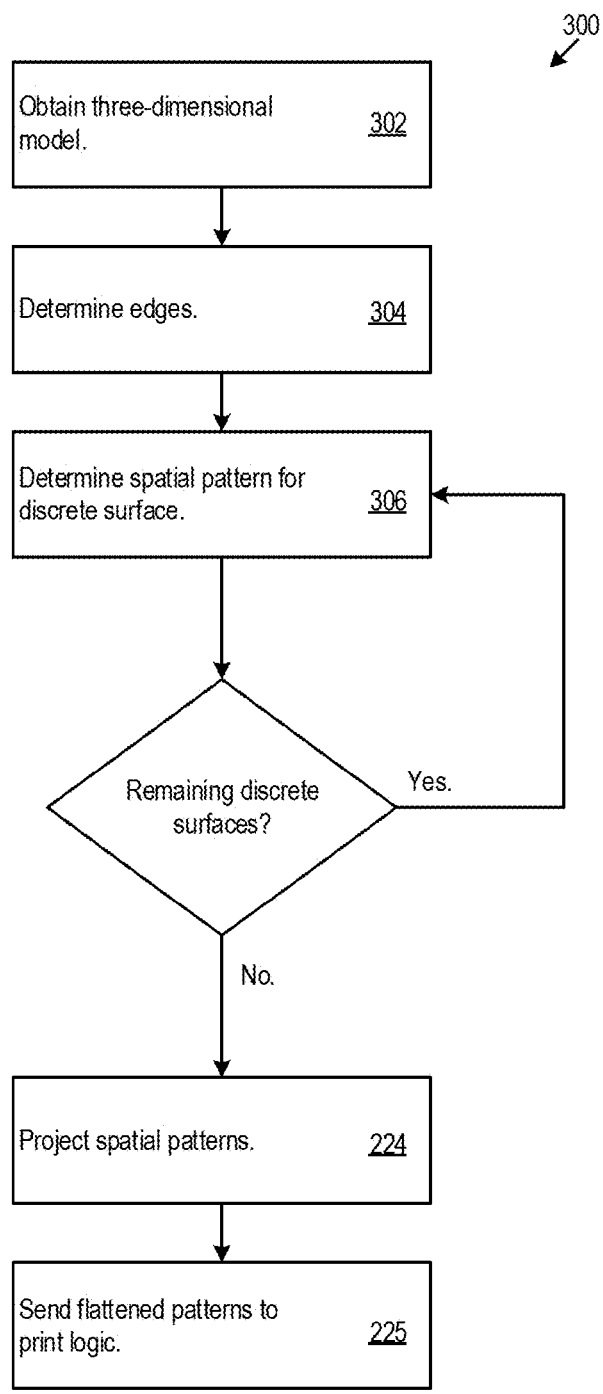
FIG. 3 shows example model logic.

Referring now to FIG. 3, example model logic 300, which may be implemented on circuitry is shown. The model logic 300 may obtain a three-dimensional model of an object with a design (302). For example, the model logic 300 may receive a three-dimensional model with the design from the design interface 118. The design interface 118 may have generated the model responsive to user input. Additionally or alternatively, the design interface 118 may have generated the model based on a model output from a third-party design package. Additionally or alternative, the three-dimensional model may have been generated by the design interface based on a scan or photograph of an existing template object. The design may include visual features that on the outer surfaces of the object. The design may exhibit continuity, include alignment continuity and/or orientation continuity.

The model logic 300 may determine edges for the three-dimensional model to break the model up into discrete surfaces (304). In some cases, the model logic may determine the positioning of the edges. The positioning of the edges may be determined based on material sheet dimensions, fabric flow, object durability and wear, object contours, seam appearance, and other factors. Additionally or alternatively, the positioning of the edges may be determined by the input from the design interface 118 or a pre-determined cover template for the object. For example, a user using the design interface 118 may determine the location for edges, such as seams, while design the object. In another example, the object may have an associated "blueprint" for the size and shape of the pieces that make-up the cover.

The model logic 300 may determine a spatial pattern for the discrete surfaces that maintains the continuity present in the design (306). The spatial patterns may include contoured surfaces in three dimensions. Accordingly, the spatial pattern are the portions of the design on the three-dimensional model that each correspond to a discrete surface on the model. The model logic 300 determines the spatial patterns such that they maintain any continuity present in the design across the edges separating the discrete surfaces.

The model logic 300 may continue to determine spatial patterns until all spatial patterns for the discrete surfaces of the model are determined (308). Once determined, the spatial patterns make-up the entire design for the object in three dimensions. However, because spatial pattern are curved/contoured in three dimensions they are impractical for printing to a flat material sheet.

According, the model logic 300 may project the spatial patterns into to two-dimensions to generate a flattened patterns for printing to the designated regions (310). The projection of the spatial patterns may a transform that maps the spatial pattern from a three-dimensional surface into a two-dimensional plane. The projection may also result in the flattened pattern corresponding in size and shape to the designated region, e.g., with allowances for material needed for joining regions and/or alignment markers. Further, the projection may account for material flow and/or stretch when applied as a cover to the object. In some cases, material modeling packages and services, such as ExactLab, may be used to determine flow parameters for the material sheets. Further, different three-dimension to two-dimension mapping techniques may be used.

For example, silhouette type projections may be used where the points three-dimensional curve are translated into a two-dimensional cross section. This may result in apparent distortion of the spatial pattern over three-dimensional contours when in two-dimensions. However, for certain materials, material stretch when applying the cover to the object may undo this apparent distortion.

In another example, a 1-to-1 surface area persevering transform may be used. Accordingly, the surface area of the curved/contoured spatial pattern is translated into an equal surface area in two dimensions.

Other transformations may be used for the projection, including a blend of different transforms. For example, a 1-to-1 transform may be blended with a silhouette type projection. The model logic 300 may determine, on three-dimensional model, portions of the cover that undergo stretching when applied to the object. Areas of stretching may be transformed using the silhouette type transform, while areas without stretching may use a 1-to-1 type transform.

In addition to transforming when projecting the spatial pattern, the model logic 300 also determines an orientation for the flattened pattern the preserves continuity the continuity of the object-design once the flattened patterns are re-joined into the object-design. Accordingly, the projection both transforms and orients.

The model logic 300 may send the flattened patterns to the print logic 400 (312).

Figure 4:
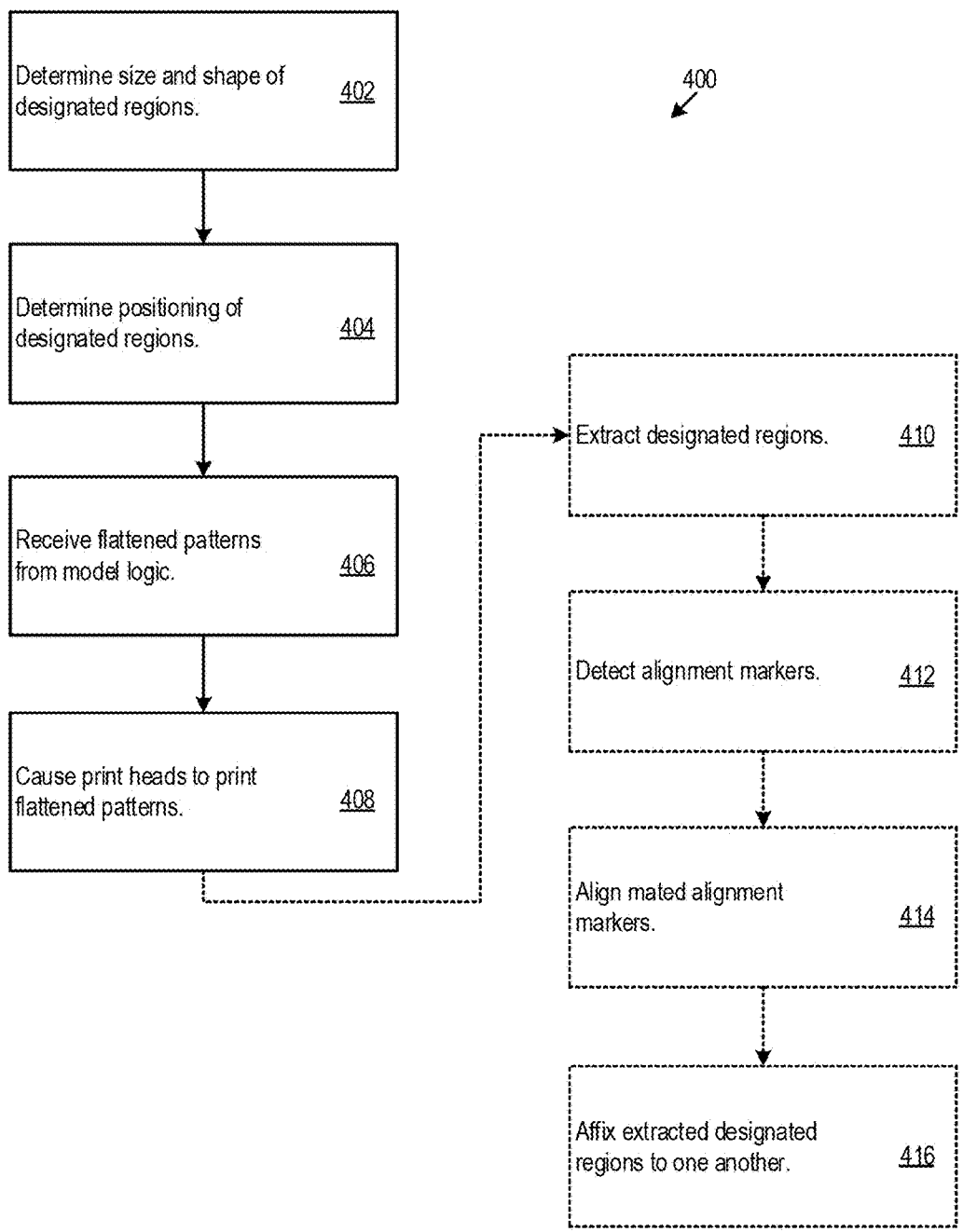
FIG. 4 shows example print logic.

Referring now to FIG. 4, example print logic 400 is shown. The print logic 400 may determine the size and shape of the designated regions corresponding to the discrete surfaces of the object (402). In some cases, template sizes and shapes for the designated regions may be provided to the print logic. For example, for a template object cover, the sizes and shapes of the designated regions may be determined before the object-design is applied. In an example scenario, template object covers may be used where the DPS 100 is used to customize the outward appearance of an otherwise set product offering. For template object covers, the print logic may determine the size and shape of the designated regions in accord with the dimensions provided in the template.

In cases where the size and shape of the designated regions is not pre-determined within a template, the print logic 400 may determine the size and shape of the designated regions using the determined edges and projection from the model logic as input. Further, the print logic 400 may add extra material to facilitate joining the regions after extraction and to account for alignment markers.

The print logic 400 may position the designated regions on one or more material sheets for printing (404). In some cases, for example when template shapes and sizes for the designated regions are available, the positioning of the designated regions on the one or more material sheets may also be pre-specified in the template. Accordingly, the print logic 400 may designate the positions for the designated regions in accord with the template.

In cases where the positioning is not pre-determined, the print logic 400 may apply a packing algorithm to position the designated regions. A packing algorithm may be a routine for placing the regions that may operate under one or more constraints. For example, the packing algorithm may be constrained to place the designated regions such that the regions do not overlap. Additionally or alternatively, the packing algorithm may constrained such that the regions are placed such that single regions are not split across multiple material sheets.

Additionally or alternatively, packing algorithms may apply placement schemes. Placement scheme may include rules or processes for placement of regions. For example, randomized placement may be used. In accord with such a randomized scheme the regions a placed randomly, but in accord with any active constraints (e.g., non-overlapping, single sheet, minimum/maximum separation between regions, threshold maximum acceptable material waste, or other constraints). In another scheme, the print logic 400 may make many (e.g., 10, 50, 100, 1000, 50000, 100000, or other number) random placements for a group of regions. After making the random placements, the print logic 400 may select one of the random placements. For example, the print logic 400 may select the placement with the lowest level of material waste. In another example scheme, the print logic 400 may use simulations to determine region placement. For example, the print logic 400 may simulate the regions a pieces within a container (sized according to the material sheet) under the effects of gravity. The print logic may use a "shake" and "settle" routine to determine the placement of the regions, where the regions are disturbed by a simulated impulse and then allowed to fall into a settled pattern. Other algorithms for irregular object packing may be used. Additionally or alternatively, the print logic 400 may also accept manual placements of the designated regions, e.g., via commands from the design interface 118.

The print logic 400 may receive the flattened patterns from the model logic 300 (406). After receiving the flattened patterns, the print logic 400 may cause the print heads 182 to print the flattened patterns on to the designated regions (408).

In cases where the DPS 100 include extraction tools 195 and/or joining tools 197, the print logic 400 may cause the extraction tools to extract the designated regions from the material sheets (410). The print logic 400 may then cause the joining tools to detect the alignment markers (412), and align mated alignment markers to one another (414). Once, the alignment makers are aligned, the print logic 400 may cause the joining tools to affix the extracted designated regions to one another (416).

Figure 5:
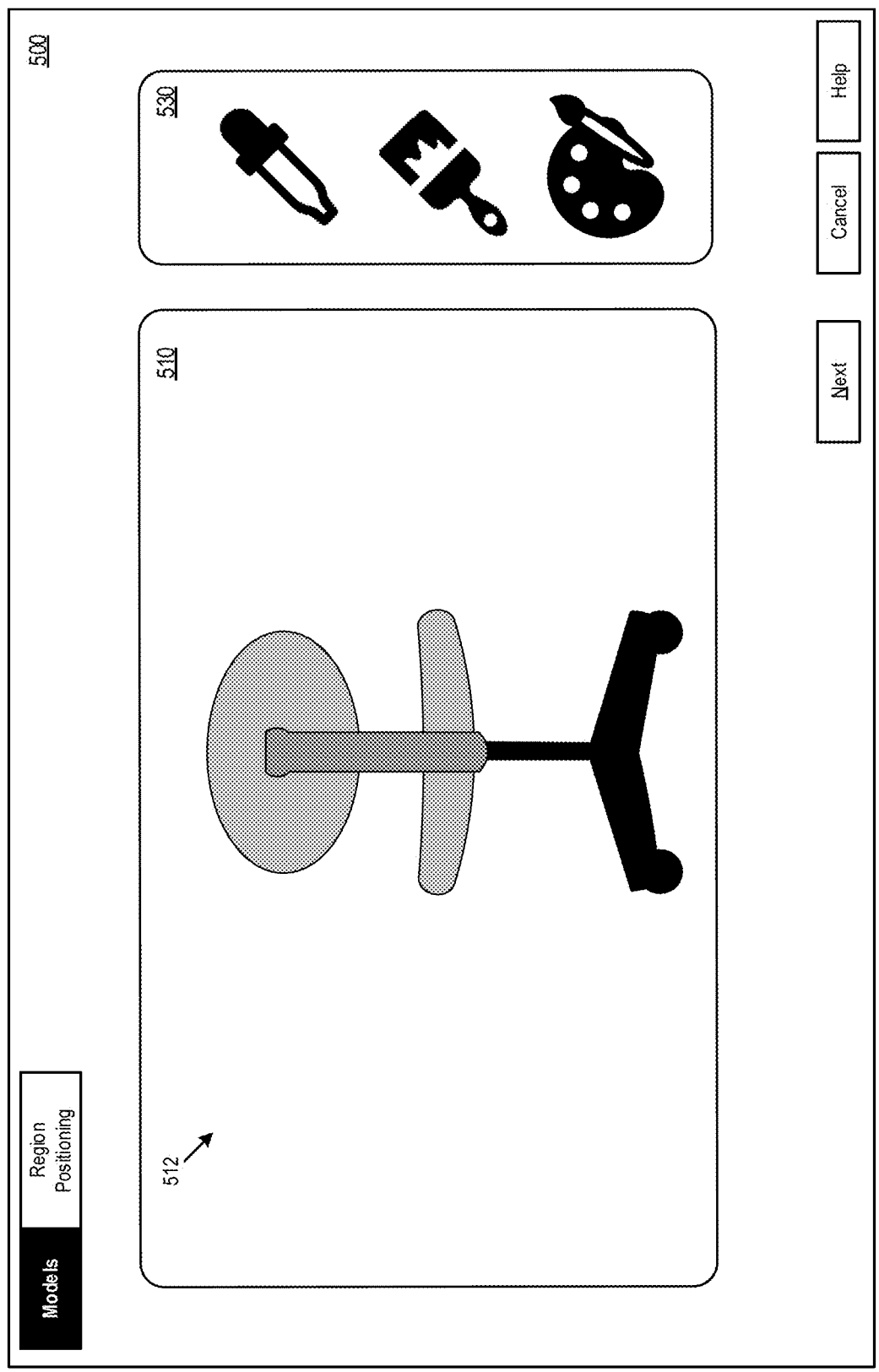
FIG. 5 shows an example design graphical user interface for a design interface.

In addition to the tools to support production of the object cover, as discussed above, the DPS 100 may also include a design interface 118 to support user design of object covers. Referring now to FIG. 5, an example design GUI 500 for the design interface 118 is shown. The example design GUI 500 include may include a design window 510 and design tools 530.

The design window 510 may show a workspace 512 for the design GUI 500. In an example scenario, the workspace 512 may display a view of a three-dimensional model 514 of the object. Using one or more HIDs, the user may enter commands to manipulate/edit the three-dimensional model to, for example, apply an object-design to the model. However, in various scenarios, the user may edit the three-dimensional model in other ways, such as, placing edges. Further, the design window may be used to perform other tasks such as manually placing designated regions for printing on material sheets. The design tools 530 may include tools for editing designs/drawing, editing edge placement, and/or placing designated regions. The user may select among available tools using input commands from the one or more HIDs The methods, devices, processing, circuitry, and logic described herein may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Examples include implementations as stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method for performing object-design for a three-dimensional object, the method comprising:
   obtaining a plurality of discrete surfaces of a three-dimensional object;
   obtaining a plurality of spatial patterns for the plurality of discrete surfaces;
   projecting the plurality of spatial patterns into a two-dimensional plane to obtain a plurality of flattened patterns; and
   outputting the plurality of flattened patterns as an object-design result for the three-dimensional object.

2. The method according to claim 1, wherein the projecting the plurality of spatial patterns into a two-dimensional plane to obtain a plurality of flattened patterns comprises:
   for a spatial pattern in the plurality of spatial patterns, applying a surface area preserving transform to a portion of the spatial pattern, or applying a silhouette-type transform to a portion of the spatial pattern.

3. The method according to claim 2, wherein orientation of a flattened pattern corresponding to the spatial pattern preserves continuity of the object-design result.

4. The method according to claim 1, wherein a spatial pattern in the plurality of spatial patterns comprises a curved surface in three dimensions.

5. The method according to claim 1, further comprising:
   printing at least one flattened pattern in the plurality of flattened patterns onto a material sheet.

6. The method according to claim 5, further comprises:
   printing more than one alignment markers onto the material sheet; and
   aligning a pair of mated alignment markers.

7. The method according to claim 6, wherein the aligning the pair of mated alignment markers comprises:
   detecting the more than one alignment markers; and
   in response to detecting a common feature of a pair of alignment markers, determining the pair of alignment markers as the pair of mated alignment markers.

8. An apparatus for performing object-design for a three-dimensional object, the apparatus comprising:
   a memory storing instructions; and
   a processor in communication with the memory, wherein, when the processor executes the instructions, the processor is configured to cause the apparatus to perform:
      obtaining a plurality of discrete surfaces of a three-dimensional object,
      obtaining a plurality of spatial patterns for the plurality of discrete surfaces,
      projecting the plurality of spatial patterns into a two-dimensional plane to obtain a plurality of flattened patterns, and
      outputting the plurality of flattened patterns as an object-design result for the three-dimensional object.

9. The apparatus according to claim 8, wherein, when the processor is configured to cause the apparatus to perform projecting the plurality of spatial patterns into a two-dimensional plane to obtain a plurality of flattened patterns, the processor is configured to cause the apparatus to perform:
   for a spatial pattern in the plurality of spatial patterns, applying a surface area preserving transform to a portion of the spatial pattern, or applying a silhouette-type transform to a portion of the spatial pattern.

10. The apparatus according to claim 9, wherein orientation of a flattened pattern corresponding to the spatial pattern preserves continuity of the object-design result.

11. The apparatus according to claim 8, wherein, wherein a spatial pattern in the plurality of spatial patterns comprises a curved surface in three dimensions.

12. The apparatus according to claim 8, wherein, when the processor executes the instructions, the processor is configured to cause the apparatus to further perform:
   printing at least one flattened pattern in the plurality of flattened patterns onto a material sheet.

13. The apparatus according to claim 12, wherein, when the processor executes the instructions, the processor is configured to cause the apparatus to further perform:
   printing more than one alignment markers onto the material sheet; and
   aligning a pair of mated alignment markers.

14. The apparatus according to claim 13, wherein, when the processor is configured to cause the apparatus to perform aligning the pair of mated alignment markers, the processor is configured to cause the apparatus to perform:
   detecting the more than one alignment markers; and
   in response to detecting a common feature of a pair of alignment markers, determining the pair of alignment markers as the pair of mated alignment markers.

15. A non-transitory computer-readable storage medium, storing computer-readable instructions, wherein, the computer-readable instructions, when executed by a processor, are configured to cause the processor to perform:
   obtaining a plurality of discrete surfaces of a three-dimensional object;
   obtaining a plurality of spatial patterns for the plurality of discrete surfaces;
   projecting the plurality of spatial patterns into a two-dimensional plane to obtain a plurality of flattened patterns; and
   outputting the plurality of flattened patterns as an object-design result for the three-dimensional object.

16. The non-transitory computer-readable storage medium according to claim 15, wherein, when the computer-readable instructions are configured to cause the processor to perform projecting the plurality of spatial patterns into a two-dimensional plane to obtain a plurality of flattened patterns, the computer-readable instructions are configured to cause the processor to perform:
   for a spatial pattern in the plurality of spatial patterns, applying a surface area preserving transform to a portion of the spatial pattern, or applying a silhouette-type transform to a portion of the spatial pattern.

17. The non-transitory computer-readable storage medium according to claim 16, wherein orientation of a flattened pattern corresponding to the spatial pattern preserves continuity of the object-design result.

18. The non-transitory computer-readable storage medium according to claim 15, wherein a spatial pattern in the plurality of spatial patterns comprises a curved surface in three dimensions.

19. The non-transitory computer-readable storage medium according to claim 15, wherein, when the computer-readable instructions are executed by the processor, the computer-readable instructions are configured to further cause the processor to perform:
   printing at least one flattened pattern in the plurality of flattened patterns onto a material sheet.

20. The non-transitory computer-readable storage medium according to claim 19, wherein, when the computer-readable instructions are executed by the processor, the computer-readable instructions are configured to further cause the processor to perform:
   printing more than one alignment markers onto the material sheet; and
   aligning a pair of mated alignment markers.

\* \* \* \* \*